(12) United States Patent
Soderberg et al.

(10) Patent No.: US 6,519,626 B1
(45) Date of Patent: Feb. 11, 2003

(54) SYSTEM AND METHOD FOR CONVERTING A FILE SYSTEM PATH INTO A UNIFORM RESOURCE LOCATOR

(75) Inventors: Joel M. Soderberg, Redmond, WA (US); Van C. Van, Kirkland, WA (US); Brian J. Deen, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,539

(22) Filed: Jul. 26, 1999

(51) Int. Cl.[7] .............................................. G06F 13/00
(52) U.S. Cl. ......................... 709/203; 709/217; 709/226
(58) Field of Search ................................. 709/200, 201, 709/203, 217, 218, 219, 225, 226, 227, 228, 229, 245

(56) References Cited

U.S. PATENT DOCUMENTS

| 5,751,961 | A | * | 5/1998 | Smyk ........................ 709/217 |
| 5,880,730 | A | * | 3/1999 | Durand ...................... 345/846 |
| 5,991,798 | A | * | 11/1999 | Ozaki et al. ................ 709/217 |
| 6,163,844 | A | * | 12/2000 | Duncan et al. ............. 713/201 |
| 6,185,733 | B1 | * | 2/2001 | Breslau et al. ................ 717/15 |

* cited by examiner

Primary Examiner—Moustafa M. Meky
(74) Attorney, Agent, or Firm—Workman, Nydegger & Seeley (57) ABSTRACT

A method is described of converting a file system path corresponding to a resource to a uniform resource locator (URL) corresponding to the resource. After receiving the file system path, the following information is obtained related to the resource located in the inputted file system path: the protocol prefix, domain name, the port number if different than default, and the URL fixed subdirectory structure if any. This information may be obtained, for example, by reference to a URL provided to a conversion module. The URL is then manufactured by first assigning the protocol prefix as the left-most characters of the URL. Then, the domain name, a colon ":" and port number if different than default, any subdirectory structure, and a latter portion of the file system path are added to the protocol prefix. Finally, any back slashes "\" are converted to forward slashes "/" to complete the conversion to the URL.

33 Claims, 4 Drawing Sheets

SYSTEM AND METHOD FOR CONVERTING A FILE SYSTEM PATH INTO A UNIFORM RESOURCE LOCATOR

BACKGROUND OF THE INVENTION

1. The Field of the Invention

The present invention relates to electronic communications. Specifically, the present invention relates to a system and method for converting a file system path into a uniform resource locator (URL).

2. The Prior State of the Art

The Internet is a world-wide network of computer systems and networks which allows a computer user to obtain a wide variety of information on demand. Specifically, to obtain desired information, a computer user first employs Internet browser software to select a uniform resource locator (URL) that identifies a potential source of the desired information. A URL is an address used to identify a resource on the Internet.

An example of a URL is as follows:

"http://www.domain.com:123/subdirectory/sub/file"

The "http://" portion of the URL is called a "protocol prefix" because it designates the protocol used in communicating the request to the server system, and in communicating back the appropriate response. The protocol prefix "http://" is common as it indicates a widely used Internet protocol called HyperText Transport Protocol (HTTP). Other protocol prefixes might include "ftp://" (File Transfer Protocol), "https://" (HyperText Transport Protocol Secure) and so forth.

The "www.domain.com" portion of the URL is called a "domain name." The domain name is a unique Internet alphanumeric address that identifies the virtual location of Internet resources related to a particular organization. For example, URLs containing the domain name "www.companyXYZ.com" might include resources related to a company fictionally named Company XYZ.

The domain name is a "virtual" location because the domain name does not necessarily correspond to any physical location. Indeed, resources that are within a common domain name may be physically stored in different memory devices, or even in entirely different servers. However, the location of the domain name is "virtual" in that the location of all the resources appears from the end-user's viewpoint to be in a common location. The servers on the Internet resolve the details of the actual physical location of the resource and make it appear to the user as though all of the resources are neatly organized under the domain name.

The ":123" portion of the URL is called the "port number." Typically, the port number is not included in a URL since a default port number (i.e., 80 for HTTP) is correctly assumed in the URL. Thus, the port number is only included in the URL in the somewhat unusual event that the port number is different than the default port number.

The "/subdirectory/sub/" portion of the URL indicates the subdirectory structure of the domain name in which the desired information resides. Although having a subdirectory structure is not mandatory in a URL, the subdirectory structure of the URL allows resources categorized under the domain name to be more finely organized just as directory structures are used to organize files in a file system. The subdirectory structure "subdirectory/sub" has multiple subdirectory levels. However, a URL might also include only one subdirectory level as in the following example URL:

"http://www.domain.com:123/subdirectory/file"

Sometimes, the subdirectory structure of the URL is related to the subdirectory structure of the file system in which the corresponding resource physically resides. For example, the URL directory "http://www.domain.com/subdirectory/" may correspond to the file system path "c:\subdirectory\" while the URL directory "http://www.domain.com/subdirectory1/" may correspond to the file system path "c:\subdirectory1\". However, often the subdirectory structure of the URL does not match the file system directory structure at all. For example, the URL directory "http://www.domain.com/subdirectory/" may correspond to resources located in the file system path "c:\main\hypo\thetical\example\" while a very similar URL directory "http:/www.domain.com/subdirectory1/" may correspond to resources located in the file system path "d:\very\different\file\system\path\". In the latter case, the subdirectory structures of the URL are known as "virtual directories" since they do not represent any physical directory structure in the file system path, but are only seen as being directories from the end-user's viewpoint.

The "file" portion of the URL identifies the name of the file that holds the actual information requested by the user. This file may typically include the extension such as ".html" which indicates that the file is written in HyperText Mark-up Language. However, numerous other file types and extensions are also transferred over the Internet.

After typing in the appropriate URL corresponding to a desired resource, the user causes a request that includes the URL to be transmitted over the Internet. For example, the user might press the "enter" key after typing the URL thereby causing the Internet browser to generate and transmit the request. The URL contained within the request is used to route the request to a destination server that can access the desired resource. The URL is also used to inform the destination server of the file system path of the desired resource according to a predetermined routine such as a mapping technique. The destination server typically retrieves the file and transmits the file back to the end-user in the response to the request.

As described above, in generating a response to an HTTP request, the URL is converted into a file system path. However, there are no prior art methods for converting the file system path into a URL.

SUMMARY AND OBJECTS OF THE INVENTION

The present invention relates to the converting of a file system path to a Uniform Resource Locator. This conversion may occur in response to a command called "PROPFIND" that is included in an extension of HyperText Transport Protocol called HTTP-DAV. For example, a "PROPFIND" command related to "http://www.domain.com:123/subdirectory/" might return, among other things, all of the URLs categorized under "http://www.domain.com:123/subdirectory/" such as, for example, the following:

http://www.domain.com:123/subdirectory/file1
http://www.domain.com:123/subdirectory/file2
http://www.domain.com:123/subdirectory/subsubdirectory1/file3
http://www.domain.com:123/subdirectory/subsubdirectory1/file4
http://www.domain.com:123/subdirectory/subsubdirectory2/file5
http://www.domain.com:123/subdirectory/subsubdirectory2/file6

Each file system path does not necessarily correspond to a URL according to any predictable rule. For example, the files corresponding to URLs "http://www.domain.com:123/subdirectory/subsubdirectory2/file5" and "http://www.domain.com:123/subdirectory/subsubdirectory2/file6" may reside on entirely different server systems even though they have a similar URL structure. Thus, in order to determine whether the files are contained within the URL subdirectory "http://www.domain.com:123/subdirectory/", the server system might actually convert the file system path for each candidate file system path into its corresponding URL.

After receiving a file system path, an apparatus such as a conversion module converts the file system path into a URL. The following information is first obtained related to the resource located in the inputted file system path: the protocol prefix, domain name, the port number if different than default, and the URL subdirectory structure. This information may be obtained, for example, by reference to a persistent database accessible by the conversion module. Also, the information may be obtained using a URL that is provided to the conversion module for conversion into a file system path.

Once this preliminary information is obtained, the building of the URL commences. For illustration purposes, the file system path "c:\directory\sub\file" is converted into an example URL "http://www.domain.com:123/subdirectory/sub/file". The building of the uniform resource locator begins by assigning, in this example, the protocol prefix "http://" as the left-most characters of the URL. The prefix protocol is selected to match the prefix protocol of the requested URL that is associated with the "PROPFIND" command. The protocol prefix used in constructing the URL can instead be "https://", "ftp://", and so forth, depending on the protocol prefix of the requested URL associated with the "PROPFIND" command.

Next, the domain name "www.domain.com" is appended to the protocol prefix to form "http://www.domain.com". This domain name is selected to match the domain name of the requested URL associated with the "PROPFIND" command. If the port number is different than the default as in the example, a colon ":" and the port number are appended to the right side of the partial URL to form "http://www.domain.com:123".

If the requested URL associated with the "PROPFIND" command has a URL subdirectory structure, such as "/subdirectory" of this example, that subdirectory structure is appended to the right side of the partial URL to form "http://www.domain.com:123/subdirectory". Next a latter portion "\sub\file" of the file system path is appended to the right side of the partial URL to form "http://www.domain.com:123/subdirectory\sub\file". Finally, any back slashes "\" are changed to forward slashes "/" to form "http://www.domain.com:123/subdirectory/sub/file.

This method results in the file system path corresponding to a resource to be converted into a URL corresponding to the resource. After obtaining all the URLs categorized within the designated parent URL, the list of URLs may be returned to the end-user.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to systems and methods for converting file system paths into a uniform resource locator (URL). Such conversion might be useful in order to determine which file system paths correspond to a certain URL subdirectory. For example, in determining the URL subdirectories and file names contained within the URL "http://www.domain.com:123/subdirectory/", the server system might convert file system paths into URLs to check for the string "http://www.domain.com:123/subdirectory/" in the resulting URL. The conversion might also be used to return a URL corresponding to a certain file system path. The conversion of the file system path to the URL may also be used for other purposes as well.

Embodiments within the scope of the present invention include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
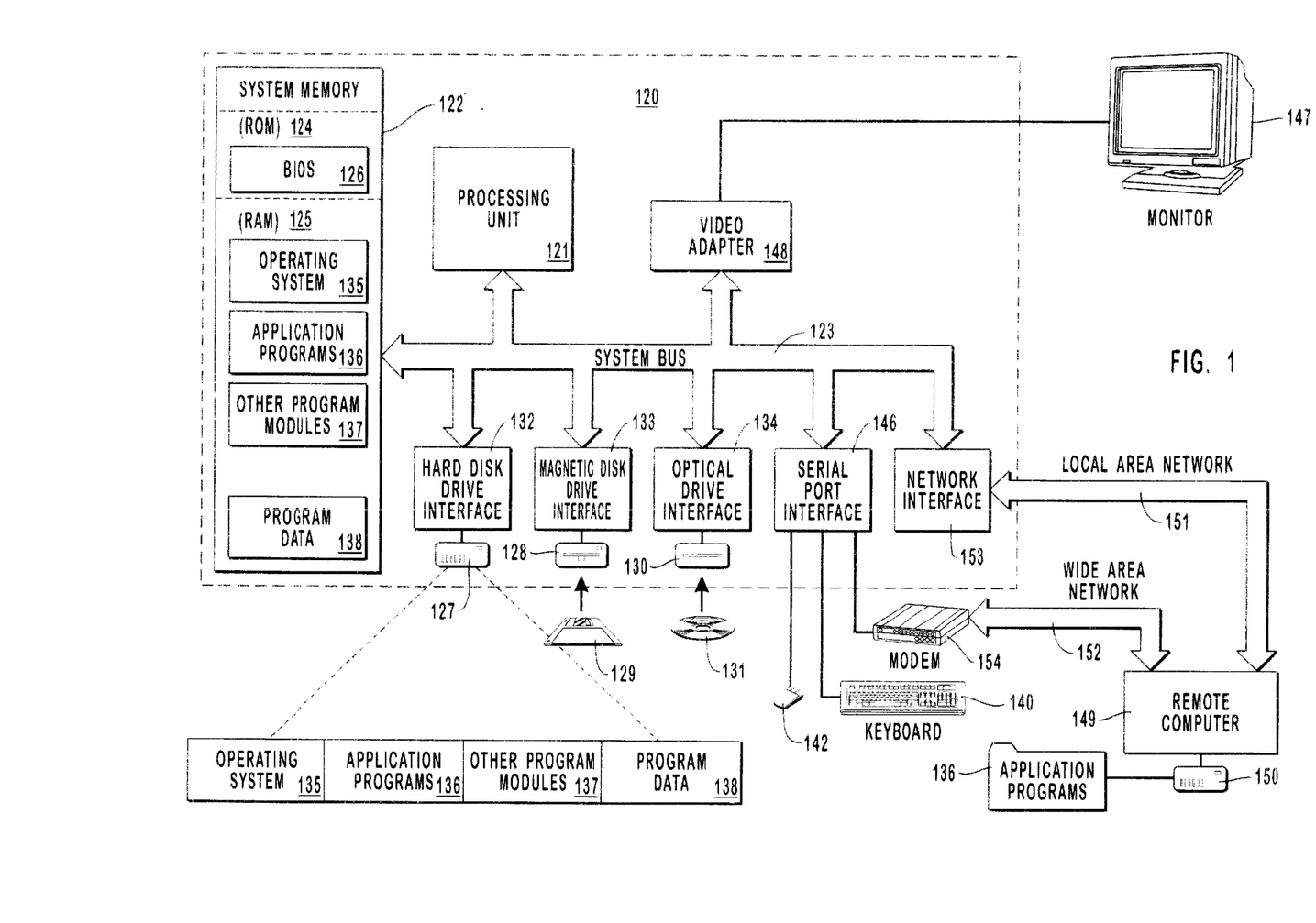
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps and acts of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

With reference to FIG. 1, an exemplary system for implementing the invention includes a general purpose computing device in the form of a computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk, not shown, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk, a removable magnetic disk 129 and a removable optical disk 131, other types of computer readable media for storing data can be used, including magnetic cassettes, flash memory cards, digital video disks, Bernoulli cartridges, RAMs, ROMs, and the like.

A number of program modules may be stored on the hard disk, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to the computer 120, although only a memory storage device 150 has been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing a communications link between the computers may be used.

Figure 2:
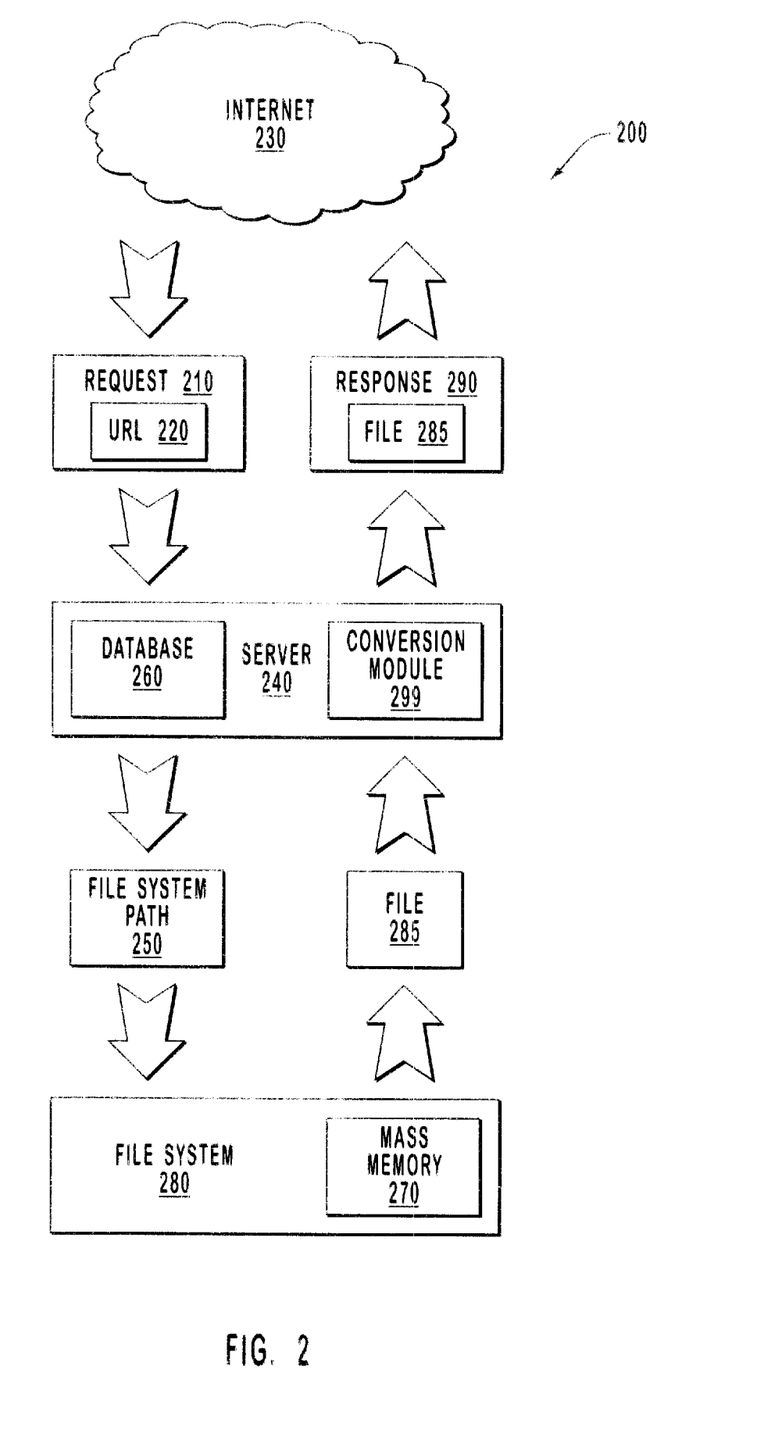
FIG. 2 is a schematic diagram of a server system in which the invention can be implemented.

FIG. 2 is a schematic diagram of a server system 200 in which the invention can be implemented. In a typical server operation, a request 210 including a URL 220 is received over the Internet 230 at a server 240. The server 240 maps the URL to a file system path 250 using a persistent database 260. The server then provides the file system path 250 to a file system 280 which retrieves the file 285 corresponding to the file system path 250 from a mass memory 270 associated with a file system 280. The file 285 is then included in the response 290 to the request 210.

In one embodiment, the Internet 230 is the wide area network (WAN) 152 of FIG. 1; the server 240 is the remote computer 149 of FIG. 1; the persistent database 260 and the mass memory 270 are at least part of the memory storage device 150 of FIG. 1; and the file system 280 and conversion module 299 are application programs stored in the memory storage device 150 of FIG. 1.

Unlike a typical server, the server 240 according to the present invention also includes a file system path to URL conversion module 299 for converting a file system path back into a URL. Such a conversion may be useful in implementing an extension of the HyperText Transport Protocol (HTTP) called "Distributed Authoring and Versioning" (DAV), also called WebDAV.

Traditionally, HTTP protocol has been designed for just publishing and reading Web pages. WebDAV is designed to extend this capability to allow end-users to remotely edit Web pages over the Internet. WebDAV includes several additional command methods that facilitate this remote editing. One of those methods is called "PROPFIND". The PROPFIND method is intended to return various properties associated with a URL. One of these properties might be a list of children URLs associated with the URL. In providing these children URLs, it may be useful to convert file system paths into the URL to confirm that these file system paths actually do correspond to qualifying children URLs. Also, it may be useful to convert file system paths that correspond to known children URLs into the children URLs so that the URLs can be returned in response to the "PROPFIND" method.

In order to accomplish this conversion, the conversion module 299 first receives a file system path to convert. Accordingly, embodiments within the scope of the present invention includes means and steps for receiving a file system path corresponding to a resource. The file system path may be supplied from the file system 280 or from any other component of the server 140.

After the file system path for the resource is received at the server 240, the server 240 performs a step of converting the file system path into a uniform resource locator (URL) corresponding to the resource using a means for converting the file system path to a uniform resource locator corresponding to the resource. In FIG. 2, this means for converting is represented by conversion module 299. This conversion module 299 may be implemented in software, hardware, or both to perform the step of converting.

Figure 3:
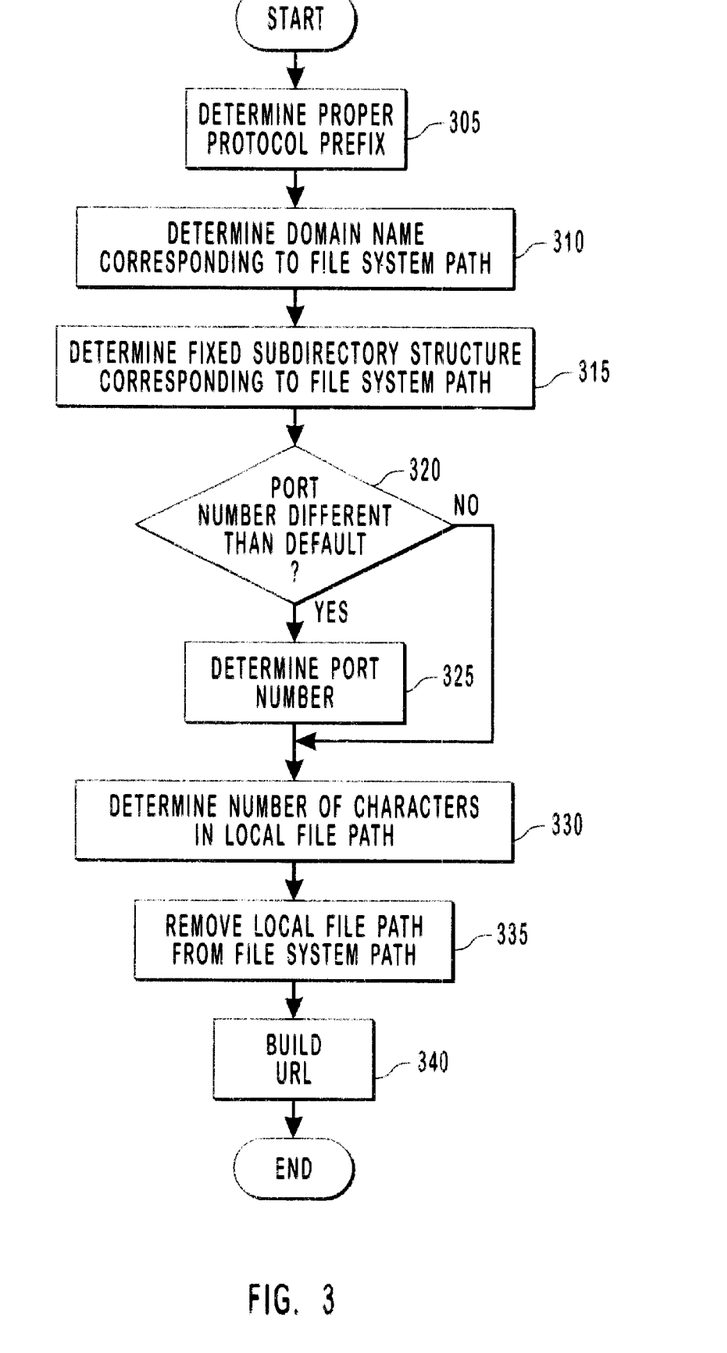
FIG. 3 is flowchart showing a method of converting a file system path into a URL according to one embodiment of the present invention.

FIG. 3 is a flowchart showing an example of corresponding acts for performing the step of converting the file system path to the uniform resource locator (URL) corresponding to the resource. The method of FIG. 3 can be performed in response to a "PROPFIND" command or any other input.

As an example illustrating the method of FIG. 3, suppose that a "PROPFIND" command associated with the URL "http://www.domain.com:123/subdirectory/" has been initiated. In the following example, this URL is referred to as the "requested URL." In response to this "PROPFIND" request, the server 240 may return all of the children URLs listed under the requested URL. An example of a child URL of the requested URL is "http://www.domain.com:123/subdirectory/sub/file". Suppose further that the file system path "c:\directory\sub\file" is to be converted into the corresponding URL "http://www.domain.com:123/subdirectory/sub/file" in response to the "PROPFIND" command to check whether the file system path corresponds to a child of the requested URL.

Initially, the conversion module 299 identifies the physical location, or the file system path, that corresponds to the requested URL "http://www.domain.com:123/subdirectory" by referring to the database 260. According to this example, the database 260 indicates that the file system path "c:\directory" corresponds to the requested URL. This file system path corresponding to the requested URL is referred to herein as the "local file path."

Conversion module 299 initially tracks the input file system path that is a candidate for corresponding to a child URL. This input file system path is as follows in the example:

File System Path: c:\directory\sub\file

Referring to FIG. 3, the proper protocol prefix for the URL is determined (step 305). Typically, the protocol prefix to be used in constructing the URL is selected to match the protocol prefix included in the requested URL, which, in this example, is "http://", indicating that the protocol is HyperText Transport Protocol. However, the protocol prefix might also be other protocol prefixes such as "https://" indicating that the protocol is HyperText Transport Protocol Secure that is often used for accessing a secured server. Alternatively, the protocol prefix might be determined by reference to the persistent database 260 of FIG. 2. Also, the protocol prefix might be set at the most common protocol prefix such as "http://" by default unless the database 260 indicates a different protocol prefix.

After the protocol prefix is determined (step 305), the relevant fields tracked by the conversion module 299 are as follows in the example:

File System Path: c:\directory\sub\file
Protocol Prefix: http://

The domain name corresponding to the file system path is also determined (step 310). As mentioned previously, conversion module 299 has already learned that the file system path "c:\directory\" corresponds to the requested URL. Thus, because the requested URL includes the domain name "www.domain.com", this domain name is selected for use in constructing the URL according to this example. Thus, after steps 305 and 310, the relevant fields tracked by the conversion module 299 are as follows in the example:

File System Path: c:\directory\sub\file
Protocol Prefix: http://
Domain Name: www.domain.com The URL fixed subdirectory structure corresponding to the file system path is also determined (step 315). In this description and in the claim, the "fixed subdirectory structure" is defined as the portion of the subdirectory structure that was included in the requested URL. The conversion module 299 has previously determined that the requested URL, which includes the subdirectory structure "\subdirectory", corresponds to the file system path "c:\directory\". Accordingly, in this example, the file system path "c:\directory\sub\file" corresponds to an initial subdirectory structure of "\subdirectory". Thus, after steps 305, 310 and 315, the relevant fields tracked by the conversion module 299 are as follows in the example:

File System Path: c:\directory\sub\file
Protocol Prefix: http://
Domain Name: www.domain.com
Fixed Subdirectory Structure /subdirectory Also, it is determined if the port number of the URL is other than the default port number (decision block 320). A port number is an identification of a service. The default port number used for HTTP protocol compliant servers is 80. If the port number is other than the default (Yes in decision block 320), then the port number is also determined (step 325) by, for example, reference to the database 260. In the example, the port number is 123 which is different than the default port number of 80. This port number may also be obtained by reference to the original requested URL. Thus, after steps 305, 310, 315, 320 and 325, the relevant fields tracked by the conversion module 299 are as follows in the example:

File System Path: c:\directory\sub\file
Protocol Prefix: http://
Domain Name: www.domain.com
Fixed Subdirectory Structure: /subdirectory
Port Number: 123

Also, the number of characters in the local file path is determined (step 330). In the example, the local file path corresponds to the file system path that results of the conversion of the requested URL into the file system path. In the example, the URL "http://www.domain.com:123/subdirectory/" was converted into the local path "c:\directory" which has 12 characters. Thus, after steps 305, 310, 315, 320, 325 and 330, the relevant fields are as follows in the example:

File System Path: c:\directory\sub\file
Protocol Prefix: http://
Domain Name: www.domain.com
Fixed Subdirectory Structure /subdirectory
Port Number: 123
Local Path Character Number: 12

After the number of characters in the local file path is determined (step 330), the local file path is removed from the file system path (step 335) by, for example, removing the left-most characters of the file system path up to the number of characters of the local file path. In the example, the left-most 12 characters of the file system path are removed. Thus, after steps 305, 310, 315, 320, 325, 330 and 335, the relevant fields are as follows in the example:

File System Path Remainder: \sub\file
Protocol Prefix: http://
Domain Name: www.domain.com
Fixed Subdirectory Structure: /subdirectory
Port Number: 123

At this stage, the conversion module 299 is prepared to build the URL (step 340) as is described in more detail below with respect to FIG. 4. Before proceeding, however, note that although the acts of determining the proper protocol prefix (step 305), determining the domain name (step 310), determining the URL fixed subdirectory structure (step 315), determining the port number (step 325), and determining the number of characters in the local file system path (step 330) are shown as occurring in series, the ordering of these steps is not critical to the invention.

Also, note that in the above example, the files within the file system path "c:\directory\" were determined to correspond to child URLs of the requested URL. This may be determined by reference to the database 260. However, the database 260 may also indicate that all files within a completely different directory on a completely different driver correspond to children URLs of the requested URL. Thus, the database 260 may indicate that all files within the subdirectory "f:\completely\different\drive\and\directory\" correspond to children URLs of the requested URL.

Figure 4:
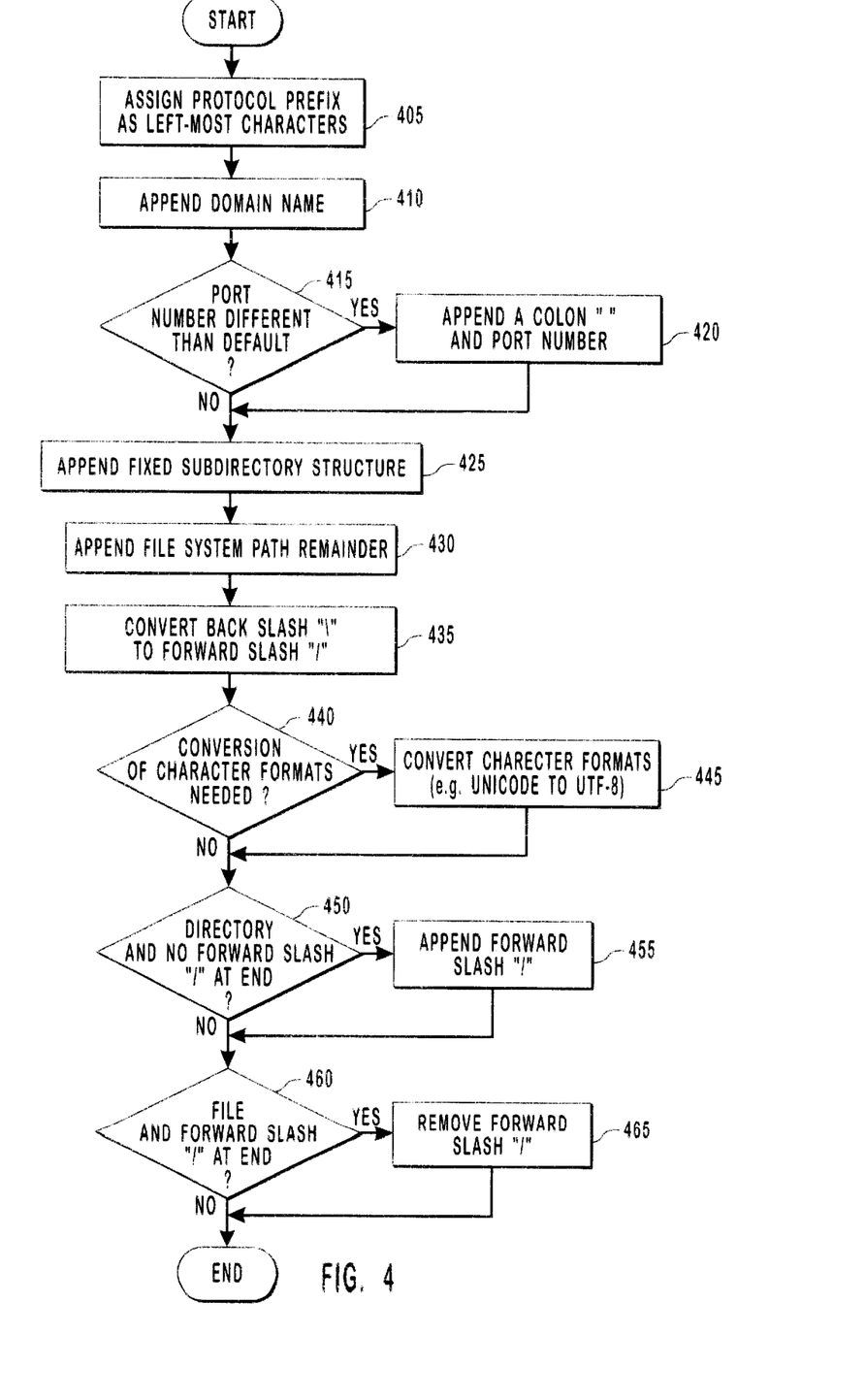
FIG. 4 is a flowchart showing a method of building a URL according to one embodiment of the present invention.

In order to build the URL (step 340) as shown in FIG. 4, the protocol prefix, such as "http://" in the example, that was obtained in step 305 is assigned as the left-most characters in the URL (step 405). Thus, after step 405, the relevant fields are as follows in the example:

File System Path Remainder: \sub\file
Domain Name: www.domain.com
Fixed Subdirectory Structure: /subdirectory
Port Number: 123
URL: http://

Next, the domain name, such as "www.myserver.com" in the example, that was obtained by step 310 is appended to the right side of the protocol prefix (step 410). Thus, after step 410, the relevant fields are as follows in the example:

File System Path Remainder: \sub\file
Fixed Subdirectory Structure: /subdirectory
Port Number: 123
URL: http://www.domain.com If the port number is different than the default port number (Yes in decision block 415), then a colon ":" and the port number is appended to the right side of the partial URL (step 420). Thus, after step 420, the relevant fields are as follows in the example:

File System Path Remainder: \sub\file
Fixed Subdirectory Structure: /subdirectory
URL: http://www.domain.com: 123

After the port number is appended (step 420), or if the port number is the default port number (No in decision block 415), the fixed subdirectory structure is appended to right side of the partial URL (step 425). Thus, after step 425, the relevant fields are as follows in the example:

File System Path Remainder: \sub\file URL: http://www.domain.com:123/subdirectory After the subdirectory structure is appended (step 425), the remainder of the file system path is appended to the right side of the partial URL (step 430). Thus, after step 430, the URL of the example appears as follows:

http://www.domain.com:123/subdirectory\sub\file

Next, all back slashes"\" are converted into forward slashes "/" (step 435) altering the URL character string as follows:

http ://www.domain.com:123/subdirectory/sub/file

If it is determined that the above character string needs to change format (Yes in decision block 440), then the character string format is changed (step 445). One common type of character format conversion might be the conversion of Unicode Characters to UTF-8 characters.

Unicode (also called "wide character") characters are each represented by unique identifiers of 16 bits. Thus, up to 65,536 (i.e., $2^{16}$) identifiers are available to identify Unicode characters. Unicode characters represent characters from many of the world's most widely written language such as English, Mandarin, Japanese, Korean, Arabic and many others. Many Internet servers now operate using Unicode text formats to accommodate the internationalization of the Internet.

UTF-8 ("Universal Transformation Format"-8) is a standard for representing the Unicode characters using identifiers of different lengths from one to three bytes. The commonly used 128 ASCII characters (including the English alphabet) are represented in Unicode using the first 128 identifiers of Unicode ranging from 0000,0000,0000,0000 in binary to 0000,0000,0111,1111 in binary. The first 256 characters of the Unicode character set from 0000,0000, 0000,0000 to 0000,0000,1111,1111 are represented in UTF-8 format by eliminating the most significant 8 bits of identifiers. Thus, the UTF-8 representation of ASCII characters range from 0000,0000 to 0111,1111. Note that the UTF-8 identifiers of ASCII characters are identical to the ASCII identifiers of ASCII characters. For example, a forward slash "/" is represented in both UTF-8 and ASCII formats using the binary identifier 0010,1111. Since most URLs are represented entirely in ASCII characters (and thus each character needs only one byte to identify it), the conversion of the Unicode characters of the URL using UTF-8 reduces the amount of memory needed to store the URL by 50%. Furthermore, since the UTF-8 and ASCII identifiers for ASCII characters are the same, the URL is in a format recognized by older devices that only recognize ASCII format.

Returning to FIG. 4, the method then determines if the URL represents a directory and does not end with a forward slash "/" (decision block 450). URLs that represent a directory should terminate with a forward slash "/" under proper current convention. Thus, if the URL represents a directory and does not end with a forward slash "/" (Yes in decision block 450), a forward slash "/" is added to the character string (step 455). In the above example, "http://www.domain.com:123/sub/file" is assumed to represent a file, and not a directory. Thus a forward slash "/" is not added in step 455 in the example.

If the URL was not a directory (No in decision block 450), it is determined if the URL represents a file and does end with a forward slash "/" (decision block 460). URLs that represent a file should not end with a forward slash "/" since only URLs representing directories terminate with a forward slash "/" . Thus, if the URL is a file and does end with a forward slash "/" (Yes in decision block 460), the forward slash "/" is removed from the character string (step 465). In the above example, since the URL character string "http://www.domain.com:123/sub/file" does not terminate with a forward slash "/" (No in decision block 455), the URL character sting is not altered.

Thus, the above describes a method for converting a file system path into a URL. The method converts character formats if needed. For example, if a file system path is presented in Unicode format, the above method may generate a URL in UTF-8 or ASCII formats.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In computer network that includes a server computer system and at least one other computer system, the server computer system hosting a first plurality of resources and a file system that assigns file system paths to the first plurality of resources, the file system paths recognized by the computer system, but not by the computer network generally, the computer network comprising a second plurality of resources that are addressable using uniform resource locators other than file system paths, a method comprising:

an act of accessing a file system path corresponding to a resource hosted by the server computer system, the file system path being used by the server computer system, but not by the computer network generally, to address the resource; and an act of converting the file system path to a uniform resource locator corresponding to the resource, the uniform resource locator being used by the network generally to address the resource.

2. The method of claim 1, wherein the file system path is a first file system path, wherein the resource is a first resource, and wherein the uniform resource locator is a first uniform resource locator, the method further comprising:

an act of accessing a second file system path corresponding to a second resource, wherein the second file system path is in a different directory than the first file system path; and an act of converting the second file system into a uniform resource locator corresponding to the second resource, wherein the second uniform resource locator has the same domain name and subdirectory structure as the first uniform resource locator.

3. The method of claim 1, wherein the act of converting the file system path to a uniform resource locator comprises the following:

an act of determining a protocol prefix corresponding to the file system path; and an act of assigning the protocol prefix as the left-most characters of the uniform resource locator.

4. The method of claim 3, wherein the act of converting the file system path to a uniform resource locator comprises the following:

an act of determining a domain name corresponding to the file system path; and an act of appending the domain name to the right side of the protocol prefix to partially form the uniform resource locator.

5. The method of claim 4, wherein the act of converting the file system path to a uniform resource locator comprises the following:

if a port number corresponding to the file system path is different than a default port number, an act of appending a colon ":" and the port number to the right side of the uniform resource locator to alter the uniform resource locator.

6. The method of claim 5, wherein the act of converting the file system path to a uniform resource locator comprises the following:

if the file system path corresponds to a URL fixed subdirectory structure, an act of appending the fixed subdirectory structure to the right side of the uniform resource locator to alter the uniform resource locator.

7. The method of claim 6, wherein the act of converting the file system path to a uniform resource locator comprises the following:

an act of appending a latter portion of the file system path to the right side of the uniform resource locator to alter the uniform resource locator.

8. The method of claim 7, wherein the act of converting the file system path to a uniform resource locator comprises the following:

if there are back slashes "\" in the uniform resource locator, an act of changing the back slashes "\" in the uniform resource locator to forward slashes "/" to alter the uniform resource locator.

9. The method of claim 8, wherein the act of converting the file system path to a uniform resource locator comprises the following:

if the file system path corresponds to a directory, and if the uniform resource locator does not terminate with a forward slash "/", an act of appending a forward slash "/" to the right side of the uniform resource locator to alter the uniform resource locator.

10. The method of claim 8, wherein the act of converting the file system path to a uniform resource locator comprises the following:

if the file system path corresponds to a file, and if the uniform resource locator terminates with a forward slash "/", an act of removing the forward slash "/" from the right side of the uniform resource locator to alter the uniform resource locator.

11. The method of claim 1, further comprising:

an act of converting formats of characters of the uniform resource locator.

12. The method of claim 11, wherein the characters of the uniform resource locator are in Unicode format, wherein the act of converting formats of characters of the uniform resource locator comprises:

an act of converting the characters of the uniform resource locator from Unicode format to characters of UTF-8 format.

13. The method of claim 11, wherein the characters of the uniform resource locator are in Unicode format, wherein the act of converting formats of characters of the uniform resource locator comprises:

an act of converting the characters of the uniform resource locator from Unicode format to ASCII format.

14. The method of claim 1, wherein the act of accessing and the act of converting are performed in response to an Internet request.

15. The method of claim 1, wherein the act of accessing a file system path corresponding to a resource comprises an act of a conversion module receiving a file system path corresponding to a resource, and wherein the act of converting the file system path to a uniform resource locator comprises the following:

an act of the conversion module determining a protocol prefix that corresponds to the resource by using a requested URL;

an act of the conversion module determining a domain name corresponding to the resource by using the requested URL; and an act of the conversion module appending the domain name to the protocol prefix to form the uniform resource locator.

16. The method of claim 15, further comprising:

if a port number corresponding to the resource is different than a default port number, an act of the conversion module determining the port number corresponding to the resource by using the requested URL; and if the port number corresponding to the resource is different than the default port number, an act of the conversion module appending a colon ":" and the port number to the right side of the domain name to alter the uniform resource locator.

17. The method of claim 16, further comprising:

if the resource corresponds to a URL fixed subdirectory structure, an act of appending the fixed subdirectory structure to the right side of the uniform resource locator to alter the uniform resource locator.

18. The method of claim 17, further comprising:

an act of the conversion module appending a latter portion of the file system path to the right side of the uniform resource locator to alter the uniform resource locator.

19. The method of claim 18, further comprising:

an act of the conversion module replacing any back slashes "\" in the uniform resource locator with forward slashes "/" to alter the uniform resource locator.

20. The method of claim 18, further comprising:

if the resource is a directory, and the uniform resource locator does not terminate with a forward slash "/", an act of the conversion module appending a forward slash "/" to the right side of the uniform resource locator to alter the uniform resource locator.

21. The method of claim 18, further comprising:

if the resource is a file, and the uniform resource locator terminates with a forward slash "/", an act of the conversion module removing the forward slash "/" from the right side of the uniform resource locator to alter the uniform resource locator.

22. The method of claim 16, further comprising:

an act of the conversion module appending a latter portion of the file system path to the right side of the uniform resource locator to alter the uniform resource locator.

23. The method of claim 15, further comprising:

an act of the conversion module appending a latter portion of the file system path to the right side of the uniform resource locator to alter the uniform resource locator.

24. A system for converting a file system path into a uniform resource locator comprising:

a server computer system configured to receive a request over the Internet, and configured to store resources that are addressable by the server computer system using a local file system path that is assigned by a local file system; and a means for converting the file system path allocated by the local file system into a corresponding uniform resource locator that is addressable by other computer systems on the Internet in response to the server receiving the request over the Internet.

25. The system of claim 24, wherein the means for converting comprises a conversion module callable by the server computer system, the conversion module stored in a computer-readable medium having computer-executable instructions for performing the following:

an act of converting the file system path to the uniform resource locator.

26. A computer-readable medium for use in a computer network that includes a server computer system and at least one other computer system, the server computer system hosting a first plurality of resources and a file system that assigns file system paths to the first plurality of resources, the file system paths recognized by the computer system, but not by the computer network generally, the computer network comprising a second plurality of resources that are addressable using uniform resource locators other than file system paths, the computer-readable medium having computer-executable instructions for performing the following:

accessing a file system path corresponding to a resource hosted by the server computer system, the file system path being used by the server computer system, but not by the computer network generally, to address the resource; and converting the file system path to a uniform resource locator corresponding to the resource, the uniform resource locator being used by the network generally to address the resource.

27. The computer-readable medium of claim 26, wherein the computer-executable instructions for accessing a file system path corresponding to a resource comprise computer-executable instructions for a conversion module receiving a file system path corresponding to a resource, and wherein the computer-executable instructions for converting the file system path to a uniform resource locator comprise the following:

computer-executable instructions for the conversion module determining a protocol prefix that corresponds to the resource by using a requested URL;

computer-executable instructions for the conversion module determining a domain name corresponding to the resource by using the requested URL; and computer-executable instructions for the conversion module appending the domain name to the protocol prefix to form the uniform resource locator.

28. The computer-readable medium of claim 27, wherein the computer-executable instructions are further for performing the following:

if a port number corresponding to the resource is different than a default port number, the conversion module determining the port number corresponding to the resource by using the requested URL; and if the port number corresponding to the resource is different than the default port number, the conversion module appending a colon ":" and the port number to the right side of the domain name to alter the uniform resource locator.

29. The computer-readable medium of claim 28, wherein the computer-executable instructions are further for performing the following:

if the resource corresponds to a URL subdirectory structure, appending the subdirectory structure to the right side of the uniform resource locator to alter the uniform resource locator.

30. The computer-readable medium of claim 29, wherein the computer-executable instructions are further for performing the following:

the conversion module appending a latter portion of the file system path to the right side of the uniform resource locator to alter the uniform resource locator.

31. The computer-readable medium of claim 30, wherein the computer-executable instructions are further for performing the following:

the conversion module replacing any back slashes "\" in the uniform resource locator with forward slashes "/" to alter the uniform resource locator.

32. The computer-readable medium of claim 30, wherein the computer-executable instructions are further for performing the following:

if the resource is a directory, and the uniform resource locator does not terminate with a forward slash "/", the conversion module appending a forward slash "/" to the right side of the uniform resource locator to alter the uniform resource locator.

33. The computer-readable medium of claim 30, wherein the computer-executable instructions are further for performing the following:

if the resource is a file, and the uniform resource locator terminates with a forward slash "/", the conversion module removing the forward slash "/" from the right side of the uniform resource locator to alter the uniform resource locator.

* * * * *

UNITED STATES PATENT AND TRADEMARK OFFICE
CERTIFICATE OF CORRECTION

PATENT NO.    : 6,519,626 B1
DATED         : February 11, 2003
INVENTOR(S)   : Soderberg et al.

It is certified that error appears in the above-identified patent and that said Letters Patent is hereby corrected as shown below:

Drawings,
Sheet 4 of 4, FIG. 4, reference no. 420, after "APPEND A COLON" please change ""'" ""'" to -- ":" --
Sheet 4 of 4, FIG. 4, reference no. 445, after "CONVERT" please change "CHARECTER" to -- CHARACTER --

Column 10,
Line 21, after "structure is appended to" please insert -- the --

Column 11,
Line 34, after "character" please change "sting" to -- string --
Line 50, after "In" please insert -- a --

Signed and Sealed this

Thirtieth Day of December, 2003

JAMES E. ROGAN
*Director of the United States Patent and Trademark Office*